US008850807B2

(12) United States Patent
Huff et al.

(10) Patent No.: US 8,850,807 B2
(45) Date of Patent: Oct. 7, 2014

(54) COMPRESSED AIR ENGINE

(75) Inventors: Christopher M. Huff, Reeds, MO (US); Danny Lee Block, Reeds, MO (US)

(73) Assignee: HB Spider LLC, Reeds, MO (US)

( * ) Notice: Subject to any disclaimer, the term of this patent is extended or adjusted under 35 U.S.C. 154(b) by 725 days.

(21) Appl. No.: 13/158,409

(22) Filed: Jun. 11, 2011

(65) Prior Publication Data
US 2011/0308241 A1    Dec. 22, 2011

Related U.S. Application Data

(63) Continuation-in-part of application No. 12/817,122, filed on Jun. 16, 2010, now Pat. No. 8,667,787.

(51) Int. Cl.
| | |
|---|---|
| *F01B 1/04* | (2006.01) |
| *B60K 6/00* | (2006.01) |
| *B60K 6/12* | (2006.01) |
| *B60K 3/02* | (2006.01) |

(52) U.S. Cl.
CPC ............... *B60K 6/12* (2013.01); *B60Y 2400/15* (2013.01); *B60K 6/00* (2013.01); *B60K 3/02* (2013.01); *B60K 2006/123* (2013.01); *Y02T 10/6208* (2013.01)
USPC .......................................................... 60/409

(58) Field of Classification Search
USPC .......................................... 60/407, 409, 410
See application file for complete search history.

(56) References Cited

U.S. PATENT DOCUMENTS

| | | | |
|---|---|---|---|
| 3,765,180 A | 10/1973 | Brown | |
| 3,925,984 A | 12/1975 | Holleyman | |
| 4,018,050 A | 4/1977 | Murphy | |
| 4,124,978 A | 11/1978 | Wagner | |
| 4,292,804 A | 10/1981 | Rogers, Sr. | |
| 4,309,620 A | 1/1982 | Bock | |
| 4,311,917 A | 1/1982 | Hencey, Jr. et al. | |
| 4,596,119 A | 6/1986 | Johnson | |
| 5,309,713 A | 5/1994 | Vassallo | |
| 5,415,245 A | 5/1995 | Hammond | |
| 5,491,977 A | 2/1996 | Cho et al. | |
| 5,515,675 A | 5/1996 | Bindschatel | |
| 5,695,430 A | 12/1997 | Moyer | |
| 6,006,519 A | 12/1999 | Hormell, Jr. | |

(Continued)

OTHER PUBLICATIONS

Wikipedia.com article "Compressed-air engine", http://en.wikipedia.org/wiki/Compressed-air_engine, downloaded Jun. 16, 2010.

HowStuffWorks.com article "How the Air Car Works", http://auto.howstuffworks.com/fuel-efficiency/vehicles/air-car.htm/printable, printed Jun. 16, 2010.

(Continued)

*Primary Examiner* — Thomas E Lazo
(74) *Attorney, Agent, or Firm* — Martin & Associates, LLC; Derek P. Martin

(57) ABSTRACT

An air engine system includes a motor coupled to the drive shaft of an air engine to control the speed of the air engine. The air engine uses compressed air from a compressed air source provided by an air compressor. The air engine may be used on a vehicle, providing a clean environmentally-friendly means of locomotion. Conventional internal combustion engines may be retrofitted to operate on compressed air. Many of the parts on an internal combustion engine are not needed after retrofitting to be an air engine, including the heads. The heads are replaced by head plates that are coupled to solenoids that provide both intake and exhaust functions to the cylinders, thereby replacing the valves in the heads. A kit provides parts and instructions for retrofitting an existing internal combustion engine to run on compressed air.

19 Claims, 13 Drawing Sheets

(56) References Cited

U.S. PATENT DOCUMENTS

| | | |
|---|---|---|
| 7,315,089 B2 | 1/2008 | Lambertson |
| 7,828,091 B2 | 11/2010 | Wedderburn et al. |
| 2009/0266069 A1 | 10/2009 | Domes |
| 2010/0296949 A1* | 11/2010 | Corley .......................... 60/407 |

OTHER PUBLICATIONS

Greencar.com article "Trends: Air Powered Cars", http://www.greencar.com/articles/trends-air-powered-cars.php, printed Jun. 16, 2010.

* cited by examiner

Retrofit Kit

List of Components to Remove
Specification for number and type of batteries
Head plates
Air solenoids
Timing mechanism
Motor
Speed controller
Accelerator
Coupler
Air compressor
Air tank
Charger
Power manager
Flywheel
DC water pump
Fittings and tubing to connect head plates to coolant source
Fittings and tubing to connect head plates to DC water pump
DC oil pump
Dump valve
Check valve
Dryer
Exhaust tank
DC vacuum pump
Rigid motor mounts
Motor mounting bracket
Charger mounting bracket
Battery cables/connectors

COMPRESSED AIR ENGINE

CROSS-REFERENCE TO PARENT APPLICATION

This patent application is a continuation-in-part of U.S. Ser. No. 12/817,122 filed on Jun. 16, 2010, which is incorporated herein by reference.

BACKGROUND

1. Technical Field

This disclosure generally relates to engines, and more specifically relates to compressed air engines.

2. Background Art

Engines that run off compressed air (air engines) have been around for more than a century. While some have been used is specialized applications, various technical challenges have prevented their widespread use in a variety of different applications. One such challenge is controlling the speed of an air engine. Many schemes have been proposed to control the speed of an air engine. Most vary the air flow and air pressure input to the engine to vary the speed of the engine. Some of these schemes require two different stages of air compression and accelerator valves that increase the complexity and cost of the system.

BRIEF SUMMARY

An air engine system includes an electric motor coupled to the drive shaft of an air engine to control the speed of the air engine. An accelerator controls the speed of the electric motor, which in turn controls the speed of the air engine. The air engine uses compressed air from a compressed air source provided by an air compressor. The air engine may be used on a vehicle, providing a clean environmentally-friendly means of locomotion.

Conventional internal combustion engines may be retrofitted to operate on compressed air as disclosed herein. Many of the parts on an internal combustion engine are not needed after retrofitting to be an air engine, including the heads. The heads are replaced by head plates that are coupled to solenoids that provide both intake and exhaust functions to the cylinders, thereby replacing the valves in the heads. A kit provides parts and instructions for retrofitting an existing internal combustion engine to run on compressed air.

The foregoing and other features and advantages will be apparent from the following more particular description, as illustrated in the accompanying drawings.

BRIEF DESCRIPTION OF THE SEVERAL VIEWS OF THE DRAWING(S)

The disclosure will be described in conjunction with the appended drawings, where like designations denote like elements, and:

FIG. 21 is a block diagram of a retrofit kit for retrofitting an existing internal combustion engine to run on compressed air.

DETAILED DESCRIPTION

An air engine system includes a motor coupled to the drive shaft of an air engine to control the speed of the air engine. The air engine uses compressed air from a compressed air source provided by a battery-driven air compressor. The speed of the motor is controlled by an accelerator input to a speed controller. The speed of the motor determines the speed of the air engine. The air engine may be used on a vehicle, providing a clean environmentally-friendly means of locomotion.

Conventional internal combustion engines may be retrofitted to operate on compressed air as disclosed herein. Many of the parts on an internal combustion engine are not needed after retrofitting to be an air engine, including the heads. The heads are replaced by head plates that are coupled to solenoids that provide both intake and exhaust functions to the cylinders, thereby replacing the valves in the heads. A kit provides parts and instructions for retrofitting an existing internal combustion engine to run on compressed air.

Figure 1:
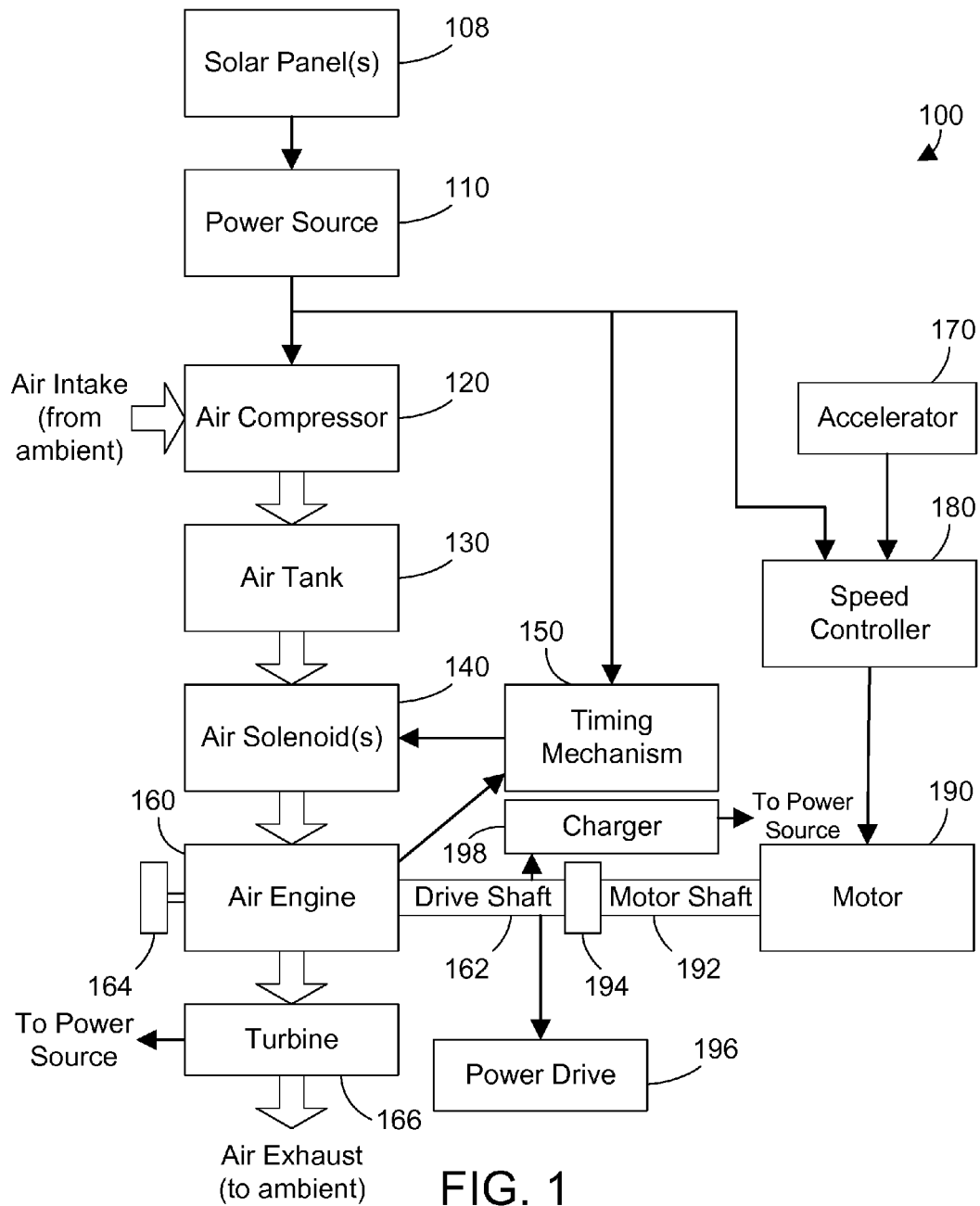
FIG. 1 is a block diagram of an air engine system.

Referring to FIG. 1, an air engine system 100 includes a power source 110 that powers an air compressor 120. The power source 110 is preferably a direct current (DC) power source that is provided by one or more batteries, such as deep-cycle vehicle batteries. The air compressor 120 receives ambient air at its intake and outputs compressed air at its output to an air tank 130. The air tank 130 is a storage receptacle for the compressed air provided by the air compressor 120. Air from the air tank 130 is provided to one or more air solenoids 140. Each air solenoid is an electrically-actuated air gate that is controlled by a timing mechanism 150. When actuated by the timing mechanism 150, the air solenoid 140 provides the compressed air in the air tank 130 to an intake of an air engine 160. The air engine 160 receives the compressed air input from the air solenoid 140, and uses the compressed air to convert the energy in the compressed air to drive a drive shaft 162. Because there is no combustion in the air engine 160, the exhaust from the air engine is air that may be exhausted to ambient with zero hydrocarbon emissions.

The timing mechanism 150 actuates the air solenoid(s) 140 according to the state of the air engine 160. The timing mechanism 150 may be mechanically operated, may be an electronic timing mechanism, or may be any suitable combination of mechanical and electronic mechanisms. The timing mechanism 150 actuates the air solenoid(s) 140 to provide compressed air into the air engine 160 at the appropriate points in time to provide power strokes to the air engine 160. More details regarding the timing mechanism 150 are provided below.

The air engine 160 drives a drive shaft 162. The drive shaft 162 provides power drive 196 to provide mechanical work. If the air engine system 100 is used in a vehicle, the power drive 196 would typically include a transmission and differential that provides power to two or more of the wheels of the vehicle.

The drive shaft 162 of the air engine 160 is coupled to a motor shaft 192 of an electric motor 190 using a suitable coupler 194. The electric motor 190 is preferably a direct current (DC) motor. The coupler 194 could be a rigid coupler or could be a flexible coupler, such as a universal joint. In one specific implementation, the air engine 160 and motor 190 are positioned so the drive shaft 162 and motor shaft 192 are aligned along their longitudinal axes so they can be directly coupled with coupler 194. In an alternative implementation, the coupler 194 could be a gear on the drive shaft 162 that is coupled via a chain to the motor shaft 192 of motor 190. In addition, the coupler 194 could include suitable means for increasing or reducing the rotational speed of the drive shaft and/or motor shaft, such as a gearbox. The coupler 194 extends to any suitable way to mechanically couple the drive shaft 162 to the motor shaft 192 such that the speed of the motor shaft 192 controls the speed of the drive shaft 162.

The motor 190 is driven by a speed controller 180 coupled to an accelerator 170. The speed controller 180 sets the speed of the motor 190 according to the state of the accelerator 170. The accelerator 170 allows an operator of the air engine system 100 to increase or decrease the speed of the air engine 160 by changing the state of the accelerator 170, which causes the speed controller 180 to drive the motor 190 to a desired speed. In one suitable implementation, the accelerator 170 is a variable resistor, and speed controller 180 drives the motor 190 with a speed that corresponds to the resistance of the variable resistor. The accelerator 170 and speed controller 180 extend to any suitable way to determine the speed of the motor 190.

The air engine system 100 may include optional components, which include one or more solar panels 108, a flywheel 164, a charger 198, and an air turbine 166. The solar panel(s) 108 are used to charge the power source 110. The flywheel 164 is used to store energy from the engine so the engine can maintain its speed over varying loads. The charger 198 is powered by the drive shaft 162 to charge the power source 110. The air turbine 166 is placed in the path of the air exhaust from the air engine 160, and converts the energy from the exhaust exiting the air engine into rotational energy that is converted to electricity to charge the power source 110. The solar panel(s) 108 and air turbine 166 will extend the operating time of the air engine system 100 by providing additional energy to the power source 110.

Figure 2:
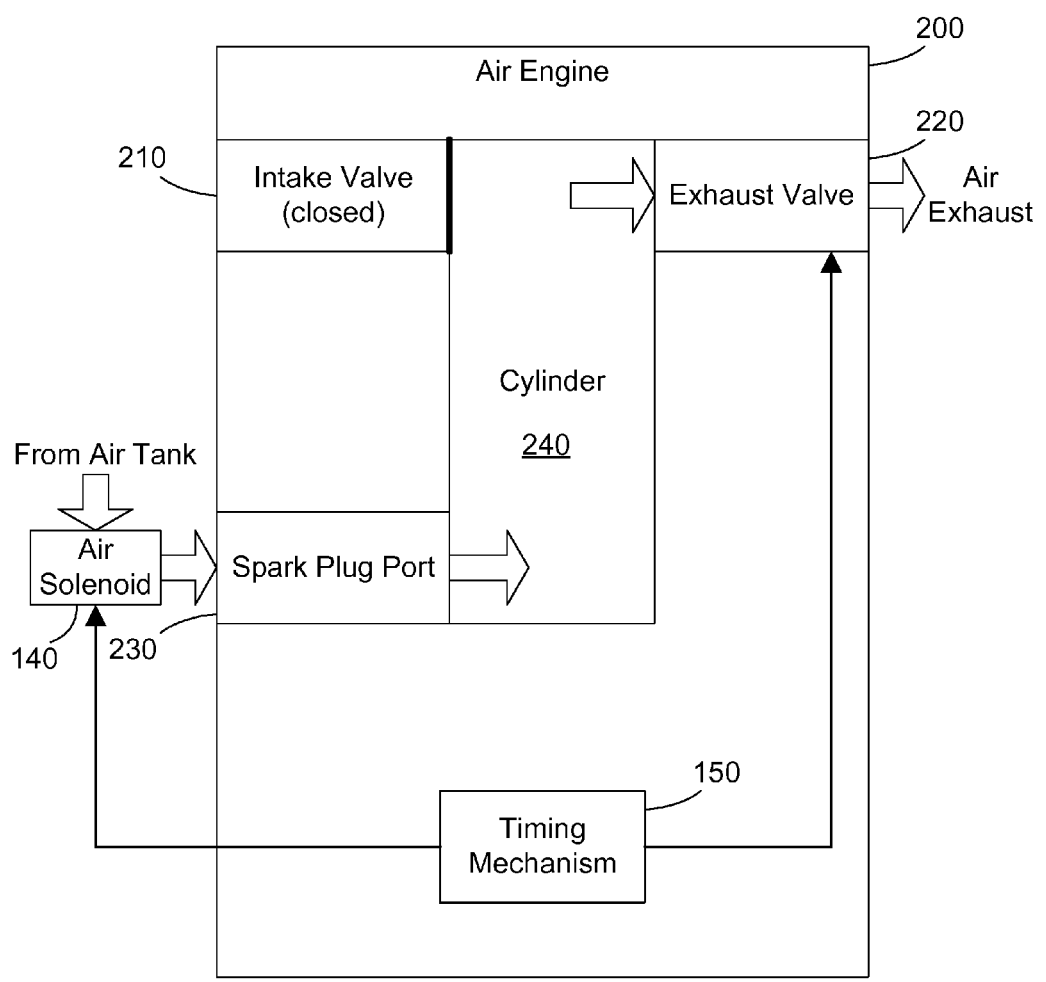
FIG. 2 is a block diagram of a first specific implementation of the air engine in FIG. 1.

One suitable implementation for the air engine 160 in FIG. 1 is shown in FIG. 2. Air engine 200 inputs air from the air solenoid 140 to the spark plug port 230 of the air engine. In this specific implementation, the air engine 200 is an internal combustion engine that has been converted to operate on compressed air without any internal combustion at all. Because there is no combustion in the air engine 200, the spark plug is not needed. The intake valve 210 is closed. One way to assure the intake valve remains closed at all times is to remove the lobe on the camshaft that would normally open the intake valve. The timing mechanism 150 actuates the air solenoid 140 at the appropriate time to provide compressed air through the air solenoid 140 through the spark plug port 230 into the cylinder 240. The timing mechanism preferably actuates the air solenoid 140 when a piston in the cylinder 240 is at or near top dead center. As a result, the compressed air pushes the cylinder downward, providing the power stroke of the air engine. The exhaust valve 220 opens to vent the air exhaust from the cylinder 240. Because there is no combustion in the cylinder, the timing mechanism 150 may actuate the air solenoid with each cycle of the piston, and may actuate the exhaust valve 220 on each cycle of the piston as well, which means every stroke of the piston is a power stoke in the air engine 200. One suitable way to actuate the exhaust valve 220 on each cycle of the piston is to modify the camshaft that actuates the exhaust valve 220 to include dual lobes. In this manner the exhaust valve 220 will open at the appropriate time during each cycle of the piston instead of on every other cycle of the piston. While air engine 200 in FIG. 2 is shown to include a single air solenoid 140, intake valve 210, exhaust valve 220, spark plug port 230, and cylinder 240, one skilled in the art will recognize these will be replicated in an engine according to the number of cylinders.

Figure 3:
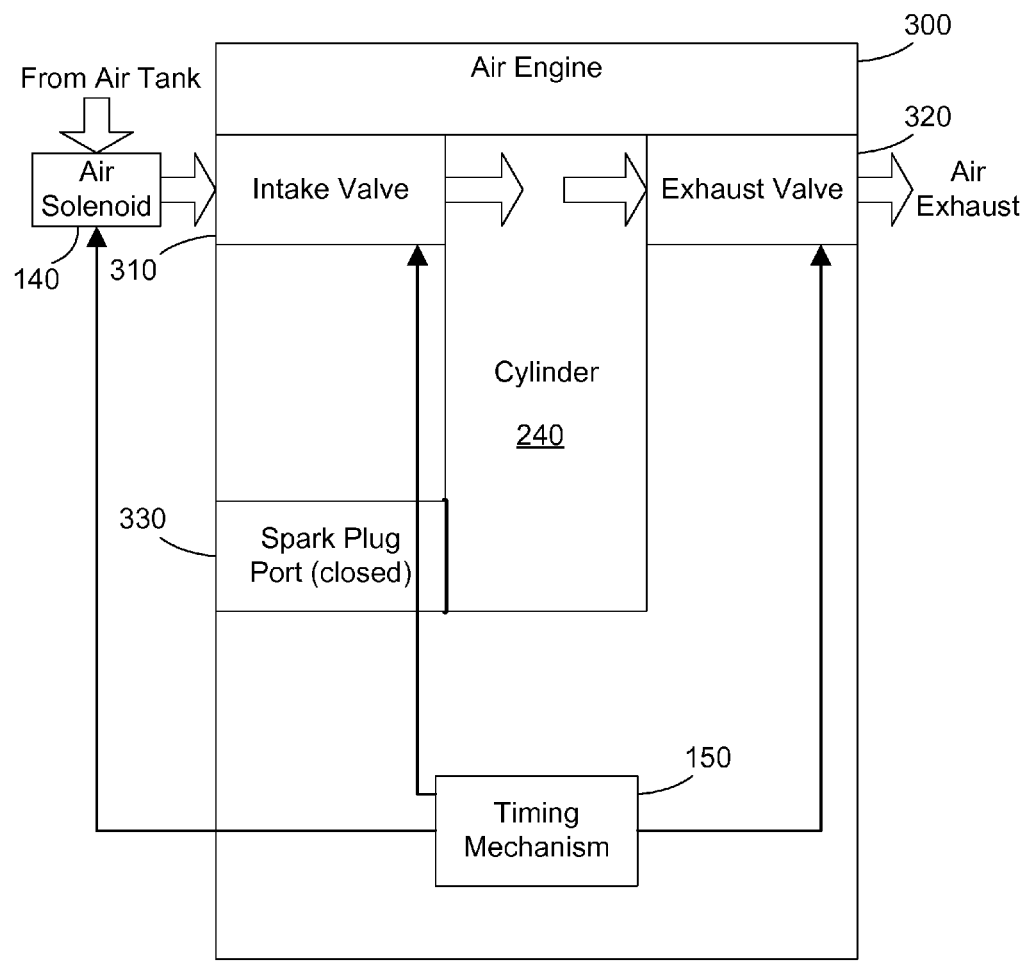
FIG. 3 is a block diagram of a second specific implementation of the air engine in FIG. 1.

An alternative implementation for the air engine 160 in FIG. 1 is shown in FIG. 3. In air engine 300, the air solenoid 140 inputs compressed air from the air tank into the intake valve 310 of the air engine. The spark plug port 330 is closed. One suitable way to plug the spark plug port is to leave a spark plug in place unconnected to any ignition wire. Another suitable way is to use a plug with the same threads as on a spark plug. Air engine 300 has some similarities to air engine 200 in FIG. 2. The timing mechanism 150 preferably actuates the intake valve 210 and exhaust valve 320 on each cycle of the piston, creating a power stroke on each cycle. One way for the timing mechanism 150 to actuate the intake valve 310 and exhaust valve 320 on each stroke is to modify the camshaft to provide dual lobes for the intake valve and dual lobes for the exhaust valve. Of course, the timing mechanism 150 could be electronic as well.

Figure 4:
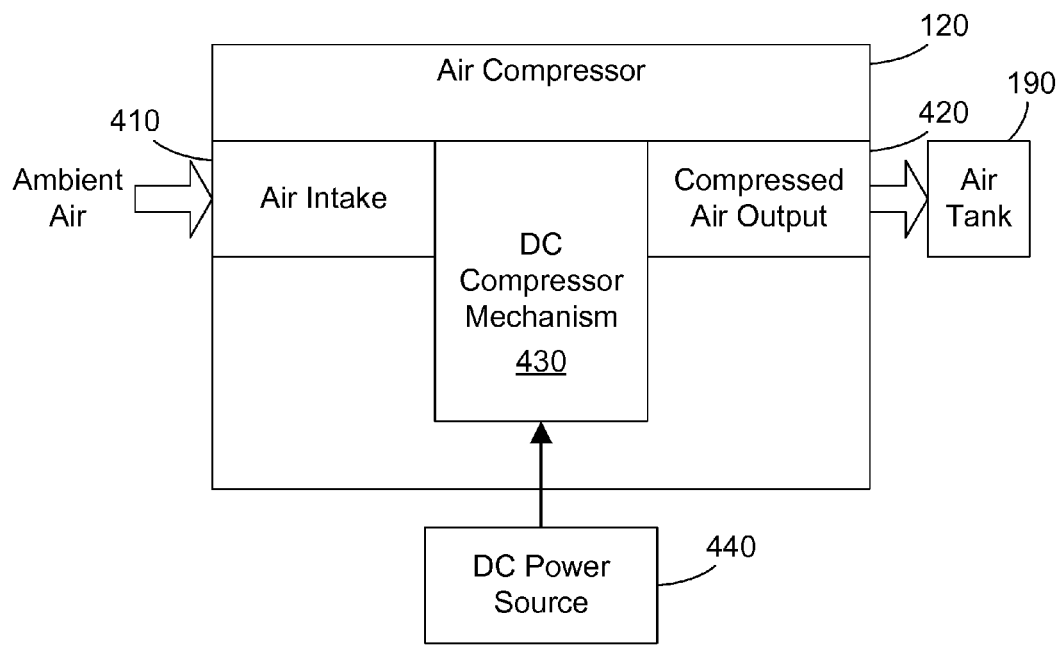
FIG. 4 is block diagram of one specific implementation of the air compressor in FIG. 1.

One suitable implementation of the air compressor 120 in FIG. 1 is shown in FIG. 4. Air compressor 120 includes an air intake 410 that receives ambient air, and inputs the ambient air to a direct current (DC) compressor mechanism 430 that is powered by a DC power source 440, which is one suitable implementation for the power source 110 in FIG. 1. The DC compressor mechanism 430 outputs the compressed air to its compressed air output 420, which is coupled to the air tank 190. One suitable implementation for DC power source 440 is one or more deep-cycle batteries such as those used on recreational vehicles.

Figure 5:
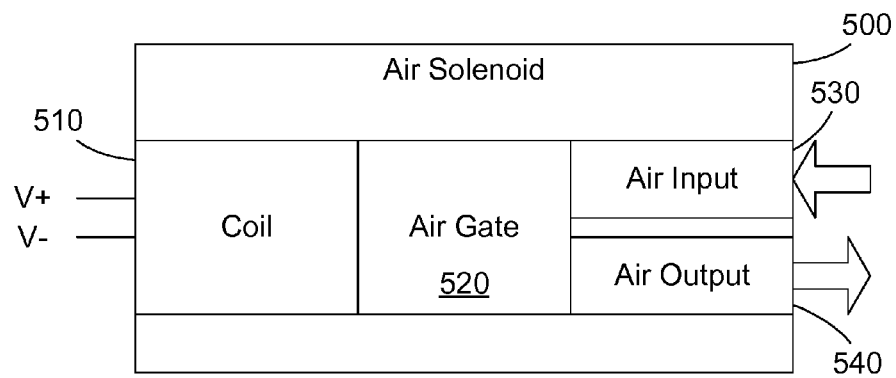
FIG. 5 is a block diagram of a first specific implementation of the air solenoid in FIG. 1.

One suitable implementation for the air solenoid 140 shown in FIG. 1 is shown as air solenoid 500 in FIG. 5. The air solenoid 500 preferably includes a coil 510 that receives an electrical input that actuates an air gate 520. When a voltage is supplied to the coil 510, the air gate actuates to connect the air input 530 to the air output 540. When the voltage is removed from the coil 510, the air gate closes to disconnect the air input 530 from the air output 540. The air solenoid 500 is thus an electrically-controlled air switch that is turned on and off by the timing mechanism 150 to provide compressed air to the air engine at the desired times. While the air solenoid described above is normally closed and opens the air gate when a suitable voltage is connected to the coil, a normally open air solenoid could alternatively be used that closes the air gate when a voltage is connected to the coil, provided the timing mechanism 150 provides the appropriate voltage to the coil at the appropriate time.

Figure 6:
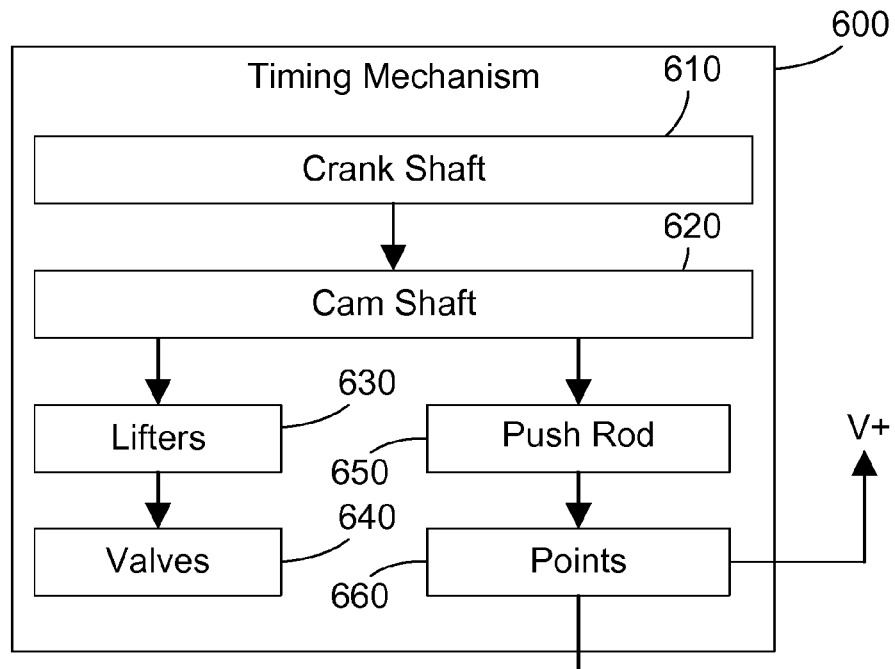
FIG. 6 is a block diagram of a first specific implementation for the timing mechanism in FIG. 1.

One suitable implementation for the timing mechanism 150 is shown in FIG. 6. The timing mechanism 600 includes a crank shaft that turns a cam shaft via a timing belt or chain. The cam shaft includes lobes that actuate lifters 630 that mechanically open and close the valves 640 as the cam shaft 620 turns. The cam shaft 620 also actuates a push rod 650 that actuates points 660. The points 660 supply a voltage V+ to the coil of the air solenoid, thereby injecting compressed air into the air engine at a time determined by the points 660. In a multiple-cylinder engine, the push rod 650 would be replaced by a distributor driven by cam shaft 620 that drives points 660 to drive the air solenoids for all of the cylinders at the appropriate times.

Figure 7:
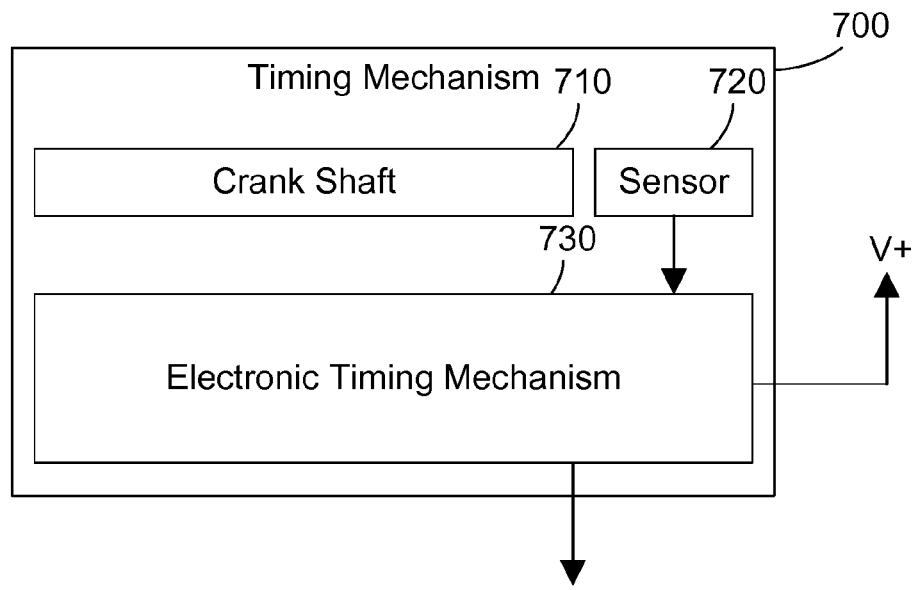
FIG. 7 is a block diagram of a second specific implementation for the timing mechanism in FIG. 1.

A second suitable implementation for the timing mechanism 150 is shown in FIG. 7. The timing mechanism 700 includes a sensor 720 that detects rotation of the crank shaft 710. The sensor supplies a signal to an electronic timing mechanism 730, which in turn supplies the drive signal to the coil of the air solenoid(s). Note for air engines that include multiple cylinders, the sensor 720 could sense different positions of the crank shaft 710 to signal to the electronic timing mechanism 730 when to actuate each air solenoid for each cylinder. In the alternative, the sensor 720 could sense a single position of the crank shaft 710 to the electronic timing mechanism 730, which could then generate the appropriate timing signals to the coils of all air solenoids in sequence, thereby driving all cylinders of a multiple-cylinder engine while sensing only one position of the crankshaft. In another alternative such as that shown in FIG. 13, multiple sensors could be provided that each control an air solenoid corresponding to a cylinder.

Note the timing mechanism 150, whether mechanical, electronic, or some combination of the two, may include a timing adjustment mechanism that alters the timing for actuating the air solenoids as the speed of the engine changes. In older internal combustion engines, a vacuum advance on the distributor adjusts the timing as engine speed increases. In newer internal combustion engines that include electronic ignition, the firing of the spark plugs is adjusted electronically according to the sensed speed of the engine. Either of these mechanisms could be used to adjust the actuation of the air solenoid(s) as the speed of the air engine changes. The timing mechanism 150 expressly extends to any suitable means for altering the timing of the actuation of the air solenoid(s) as the speed of the air engine changes.

Figures 8, 9:
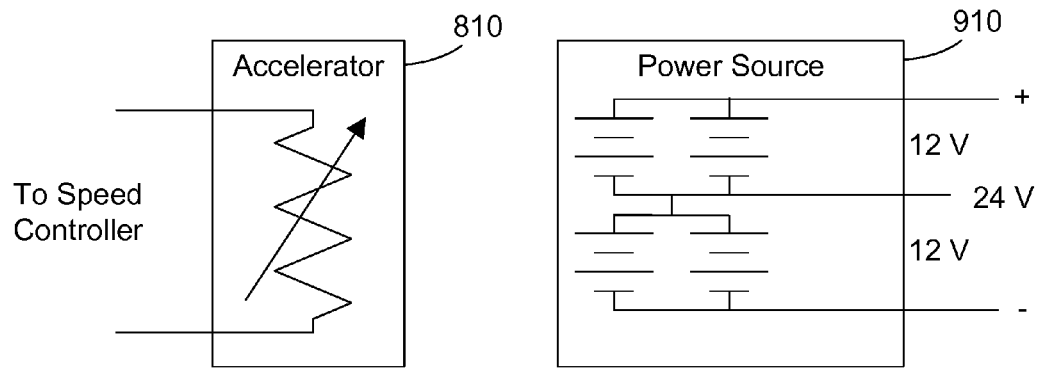
FIG. 8 is a block diagram of one specific implementation for the accelerator in FIG. 1.
FIG. 9 is a block diagram of one specific implementation for the power source in FIG. 1.

One suitable implementation for the accelerator 170 in FIG. 1 is shown in FIG. 8. The accelerator 810 is a suitable variable resistor (or rheostat) coupled to the speed controller. The speed controller in this implementation varies the speed of the motor 190 according to the resistance of the accelerator 810. When the air engine system 100 is used in a vehicle, the accelerator 170 is preferably a variable resistor with a linear plunger that allows a foot pedal to be coupled to the linear plunger such that when the driver of the vehicle presses the pedal, the resistance changes to increase the speed of the motor, and when the driver of the vehicle takes the foot off the pedal, a spring returns the linear plunger to its undepressed position, which corresponds to a resistance that causes the motor to run the air engine at an idle speed. In this manner, a linear variable resistor can function in similar fashion to known accelerator pedals in known vehicles.

One suitable implementation for the power source 910 is shown in FIG. 9 to include four 12 volt deep-cycle batteries, similar to those used in recreational vehicles. In the specific configuration shown in FIG. 9, two are connected in parallel, the other two are connected in parallel, and the two sets are then connected in series. This provides two sources of 12 volt DC power, along with 24 volt DC power.

Figure 10:
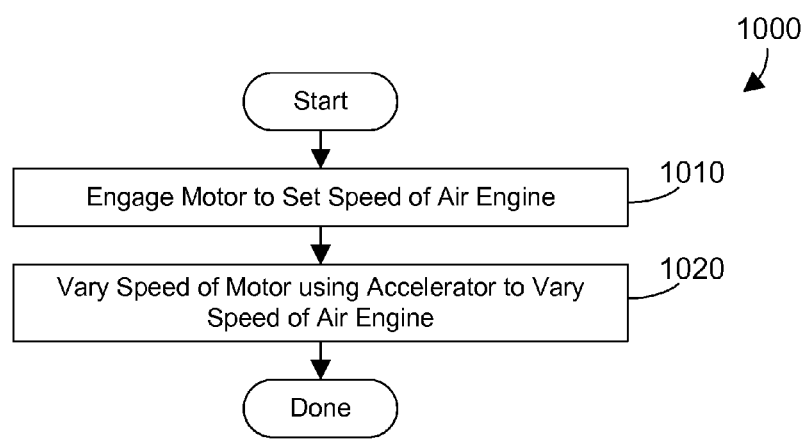
FIG. 10 is a flow diagram of a method for operating the air engine system in FIG. 1.

Referring to FIG. 10, a method 1000 for operating the air engine begins by engaging the motor to set the speed of the air engine (step 1010). The rotation of the air engine causes the timing mechanism 150 to actuate the air solenoid(s) 150, which causes the air engine 160 to run at the speed determined by the motor. The speed of the motor may then be varied using the accelerator to vary the speed of the air engine (step 1020).

Known air engines use complex means to control the speed of the air engine, including multiple stages of compression and means such as accelerator valves for varying the air input to the engine. Varying air pressure and air flow to an air engine to control the speed of the air engine requires sophisticated and complex controls that add to the complexity and cost of an air engine. The air engine system 100 disclosed and claimed herein avoids complex means to control of the speed of the air engine by supplying a motor external to the air engine to set the speed of the air engine. Once the motor determines the speed of the air engine, the air can provide the power stroke to the air engine at that speed directly from the air tank without trying to vary the flow of the air into the engine to vary its speed. The result is the motor turns without taking a substantial amount of power from the power source because most of the power is supplied by the air engine. The combination of the air engine to supply the power and the motor to easily set the speed of the air engine results in an air engine system that allows easily varying the speed of the air engine using an accelerator that controls the speed of the motor coupled to the air engine. The motor has good low-end torque but has significantly less torque at higher speeds. The air engine, in contrast, has poor low-end torque but provides significant torque at higher speeds. Thus, using the motor to start the air engine and to control the speed of the air engine allows the motor to control the speed of the air engine while allowing the air engine to provide a majority of the work at normal operating speeds. Note also the motor acts as a starter for the air engine, eliminating the need for using a traditional starter.

Prototype

A prototype was built to test the design of the air engine system disclosed herein. A Golfkar golf cart was modified. The configuration of the air engine in the prototype is similar to that shown in FIG. 6. The engine on the golf cart was a Kohler K-181 series single cylinder 8 horsepower (hp) internal combustion engine. The camshaft was modified to remove the lobe that drives the intake valve, and to add an additional lobe for the exhaust valve. The result is the intake valve is always closed, as shown in FIG. 2, while the exhaust valve opens during every cycle of the piston. The air solenoid used was a Parker air solenoid, part number N3553904553 with a 24 volt coil, which is available from Parker Hannifin, 6035 Parkland Blvd, Cleveland, Ohio 44124. The air solenoid has one input and two outputs, with the unused output plugged. The air compressor used was an Oasis 24 volt DC air compressor, part number XD4000-24 that provides 10.1 cubic feet per minute (CFM) at 150 pounds per square inch (PSI). The DC motor is an Oasis 1.7 hp motor that runs on 24 volts. The air compressor and motor are available from Oasis Manufacturing, 23011 Alcalde Dr., Suite P, Laguna Hills, Calif. 92653. The speed controller is part number 174298.00 D09 with a 24 volt input manufactured by Leeson Electric Corporation, Grafton, Wis. 53024. The accelerator is a variable resistor (rheostat) that came with the speed controller with a variable resistance from 0 to 1K ohms, and was mounted below the seat so it could be easily turned by hand by the driver of the golf cart. The air tank is 25.5 inches by 14.75 inches by 5.5 inches, providing a total capacity of approximately 2,070 cubic inches. The batteries used are four deep-cycle batteries connected as shown in FIG. 9 to provide both 12 volt and 24 volt power. Because the air solenoid selected needs to be actuated by closing a circuit, and because the points are normally closed and open when the air solenoid needs to be actuated, custom points were designed and built to replace the factory points on the Kohler engine to be normally open, and to close when the air solenoid needs to be actuated.

When the prototype golf cart is operated, the air compressor is first activated to fill the air tank with compressed air to a pressure of 150 PSI. Once the air tank is pressurized to 150 PSI, the air compressor turns off until the air pressure falls to 100 PSI, which turns the compressor back on. A toggle switch supplies power to the speed controller. With the accelerator knob in the minimum position, the toggle switch is switched, which causes the speed controller to drive the motor to the minimum speed defined by the accelerator knob. Turning the air engine with the motor causes the points to close, which starts air flow through the engine. The air flow causes the engine to idle at the speed determined by the minimum speed of the motor. The variable resistor (accelerator) knob for the motor may be turned to set the speed of the motor, which directly controls the speed of the air engine. Once the air engine is running at a higher speed, the compressed air provides a majority of the power, while the motor turns at the desired speed without consuming a great deal of power from the batteries. The speed of the air engine can be easily changed by turning the knob of the variable resistor that acts as the accelerator. Turning the knob clockwise increases the speed of the motor and air engine, while turning the knob counterclockwise decreases the speed of the motor and air engine. The result is a very simple air engine system that provides simple and effective speed control and provides energy consumption that is significantly better than the 8 hp internal combustion engine. By providing a motor to control the speed of the air engine, the power of the air engine may be supplied by the simple system shown and described above without the need of varying the air flow or pressure of the compressed air to vary the speed of the air engine. The design is thus very simple and elegant, and produces very good performance at very low cost.

Measured Performance

The golf cart prototype was run at an ambient temperature of 53 degrees. The starting voltage of the batteries was 25.3 volts. The accelerator knob was set to its maximum value, which caused the motor to turn the air engine at approximately 2,700 revolutions per minute (RPM). The golf cart was run for 1 hour and 10 minutes before the batteries were discharged, at which time the batteries measured 24.3 volts. The air engine head temperature at the end of the test was 151 degrees Fahrenheit, and the air engine exhaust temperature was 107 degrees Fahrenheit.

A comparison is now possible with the golf cart using its internal combustion engine compared to the golf cart modified with the air engine system disclosed and claimed herein. An 8 hp single-cylinder engine under load consumes approximately 1 gallon of gasoline per hour. Assuming a price of $2.75 per gallon of gasoline, this means the fuel cost to power the golf cart using gasoline is approximately $2.75 per hour. For the prototype golf cart with the air engine system described above, the maximum motor current is 90 amps at 24 volts, and the maximum air compressor current is 90 amps at 24 volts. The result is a theoretical maximum of 180 amps at 24 volts, which produces a theoretical maximum power consumption of 180 amps times 24 volts, or 4,320 watts per hour. If we assume a high efficiency charger is used to recharge the batteries that has a charge efficiency of 85%, and if we assume battery efficiency of 90%, this means the total energy required to supply the 4,320 watts is (4,320/(0.85*0.90))=5,650 watts. At a cost of $0.10 per kilowatt hour, this means the energy required to power the air engine golf cart prototype is $0.57 per hour. Note this estimate is based on the theoretical maximum current draw of the air compressor and motor. During the test run, the air compressor cycled on and off, and was not on constantly. While the motor was being constantly driven to set the speed of the air engine, most of the power was supplied by the air engine drive shaft, so the current draw from the motor is estimated to be significantly less than the 90 amps maximum that is specified for the motor. But even assuming the maximum current draw by both the compressor and the motor, the golf cart still produces a cost that is 0.57/2.75, or 21% of the cost of operating the same engine in the same golf cart on gasoline. It is believed that further testing will reveal power input to the air engine system that is significantly less than the specified maximum, thereby further enhancing the efficiency of the air engine system. In addition, as the price of gasoline increases, the advantages of the air engine will be increasingly evident.

Vehicles

The air engine system disclosed and claimed herein can be used to power vehicles. Of course, things will necessarily scale up for engines with multiple cylinders. The number of batteries will necessarily increase, and the size of the motor, air compressor and air tank will also necessarily increase. But based on the test results obtained from the golf cart prototype, it is believed the concepts proven on the simple one cylinder prototype will scale well to engines with four, six or eight cylinders (or more). The result will be a vehicle that can run for a fraction of the energy cost of internal combustion engines, while burning no fossil fuel. The resultant air engine system thus provides an environmentally-friendly way to provide significant energy savings for operating a vehicle.

A conventional internal combustion engine in a vehicle may be retrofitted to run as an air engine as disclosed and claimed herein. A 1994 ½ ton Chevrolet 2-wheel drive pickup truck with a 350 cc engine and a 700R automatic transmission has been retrofitted to run on compressed air. The details in FIGS. 11-20 show how this vehicle was retrofitted to run on compressed air, and FIG. 21 shows a retrofit kit that includes components used in the retrofit.

Figure 11:
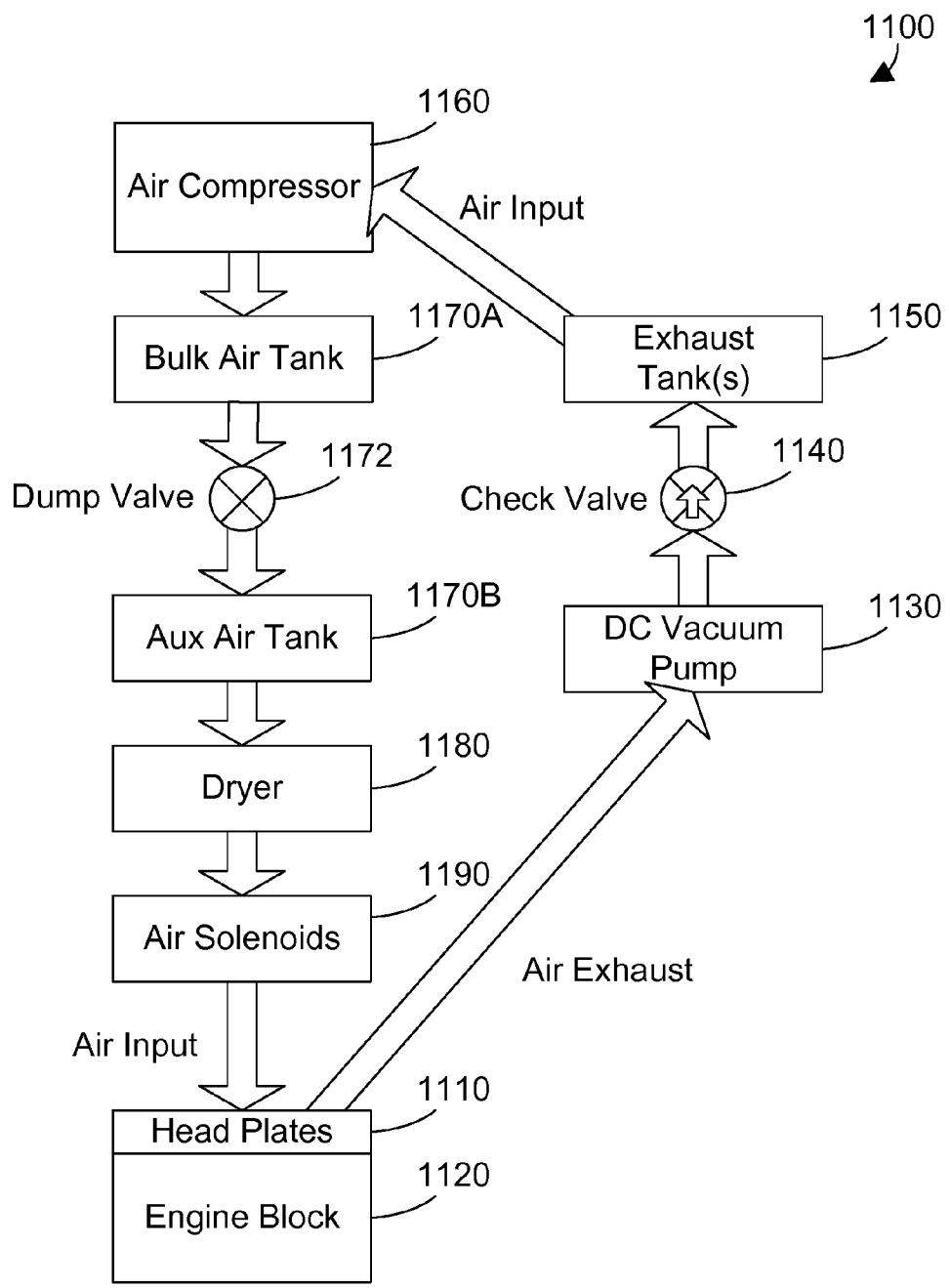
FIG. 11 is an air flow diagram of an air engine that was made by retrofitting an existing internal combustion engine.

FIG. 11 shows the air flow system 1100 for the retrofitted Chevrolet pickup. The air compressor 1160 receives air input from one or more exhaust tanks 1150. Air compressor 1160 is one suitable example for air compressor 120 in FIG. 1. The air compressor 1160 is an Airbase Industries compressor model number 42-56 that has a capacity of 43 cubic feet per minute (CFM) at 175 pounds per square inch (PSI), and runs on 96 volts direct current (DC). The air from the air input is compressed by the air compressor 1160 into a bulk air tank 1170A. The air compressor 1160 and bulk air tank 1170A were placed in the bed of the pickup. An auxiliary air tank 1170B was put under the hood in the engine compartment. A line was run from the bulk air tank 1170A to a dump valve 1172 in the cab to the auxiliary air tank 1170B. The dump valve 1172 allows depressurizing the air tanks 1170A and 1170B. While the prototype was built with a manual dump valve, the dump valve 1172 shown in FIG. 11 could be either manual or automatic. For example, the dump valve 1172 could be an automatic over-pressure valve that would automatically dump air from the air tanks 1170A and 1170B if the pressure gets above some specified threshold. Note the combination of air tanks 1170A and 1170B together are one specific implementation for air tank 130 in FIG. 1.

The auxiliary air tank 1170B is connected to a dryer 1180. The dryer 1180 is a Parker Hannifin dryer, part number P3NRA98BNT, and keeps the air flowing to the air solenoids dry. The dryer 1180 is connected to the air solenoids 1190, which provide air input to the head plates 1110. The head plates 1110 replace conventional heads on the engine, and are discussed in more detail below. The air is introduced by the air solenoids 1190 through the head plates 1110 into the cylinders in the engine block 1120 under control of a timing mechanism that provides the compressed air in each cylinder at the appropriate time to provide a power stroke to the piston in the cylinder. Air is exhausted from the cylinders through the head plates 1110 to a DC vacuum pump 1130. Any suitable vacuum pump could be used. One suitable vacuum pump is a Comp Cams electric brake booster 5500 vacuum pump. The DC vacuum pump provides vacuum pressure to draw the air exhaust from the cylinders into one or more exhaust tanks 1150. A check valve 1140 is placed between the DC vacuum pump 1130 and the exhaust tanks 1150 to assure no air flows from the exhaust tanks 1150 back into the outlet of the DC vacuum pump 1130. The exhaust tank(s) 1150 then provide the air input to the air compressor 1160.

One of the advantages of the system shown in FIG. 11 compared to the system shown in FIG. 1 is the air flows in a closed system. In FIG. 1, the air intake to the air compressor 120 is from ambient, and the air exhaust from the air engine 160 through the turbine 166 is to ambient. In air flow system 1100 shown in FIG. 11, the air is recycled over and over again in closed system, which means the dryer 1180 will not have to work as hard to keep the air dry compared to a system that is taking in ambient air, which may include a significant amount of moisture. The air flow system 1100 contemplates the use of multiple exhaust tanks 1150. In such a system, the output of the check valve 1140 would be routed to air solenoids that control the flow of air into multiple exhaust tanks 1150. For example, the DC vacuum pump 1130 could begin exhausting air into a first exhaust tank. Once the pressure in the first exhaust tank reaches some defined threshold, air solenoids could be activated to cause the DC vacuum pump 1130 to be connected to a second exhaust tank. Once the pressure in the second exhaust tank reaches some defined threshold, air solenoids could be activated to cause the DC vacuum pump to be connected to a third exhaust tank. A control system could then cause the air compressor 120 to receive air input from an exhaust tank that is already to a defined pressure while the DC vacuum pump 1130 is pressurizing a different exhaust tank. The disclosure and claims herein expressly extend to any suitable number of exhaust tanks and any suitable mechanisms for switching between exhaust tanks and the air input of the air compressor and for switching between the output of the vacuum pump and the exhaust tanks. Because there is no combustion in the air engine, the air coming out of the air engine as air exhaust is not significantly different in quality than the air going into the air engine via the air solenoids. Because the air exhaust does not contain hydrocarbon pollutants, as is the case with an internal combustion engine, the air exhaust can be directly recycled to the air input of the air compressor.

Figure 12:
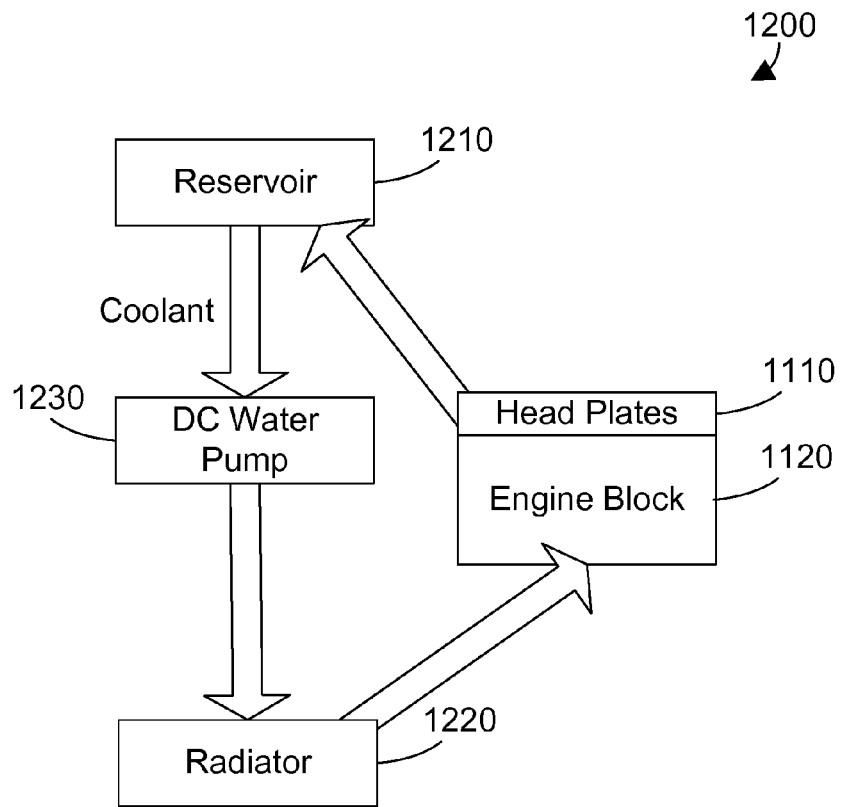
FIG. 12 is a coolant flow diagram of the air engine in FIG. 11.

FIG. 12 shows the coolant system 1200 in the retrofit Chevrolet pickup. The traditional radiator is removed. The heat generated by the air engine is significantly less than the heat generated by the internal combustion engine, so the radiator requirements are significantly reduced. The large radiator for the internal combustion engine may thus be replaced by a much smaller radiator 1220, such as one that is typically used to cool automatic transmission fluid. The overflow reservoir 1210 for the internal combustion engine may then be used as the fill point for the coolant system 1200. The reservoir 1210 is connected to the DC water pump 1230, which is in turn connected to the radiator 1220. The DC water pump 1230 draws coolant from the reservoir, and pumps coolant through the radiator 1220 to the engine block 1120. The coolant flows through the engine block 1120 and through the head plates 1110. The coolant flows from the head plates 1110 to the reservoir 1210. One suitable DC water pump is a Summit Racing 12-0018 electric water pump that runs on 12 VDC, but there are many DC water pumps that are available and known to those skilled in the art. Note the terms water and coolant are used interchangeably herein, as one skilled in the art will recognize that water is a coolant and various combinations of water with other chemicals such as propylene glycol (anti-freeze) also makes a suitable coolant, and that water pumps in engines are made to pump any liquid that acts as a suitable coolant.

Figure 13:
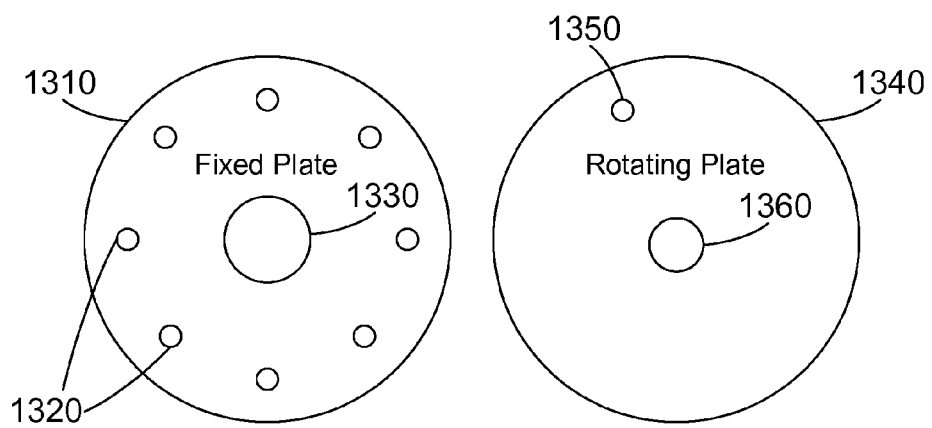
FIG. 13 is a diagram showing a third suitable implementation for the timing mechanism 150 shown in FIG. 1 for the air engine made by retrofitting an existing internal combustion engine.

FIG. 13 shows two circular plates that make up the timing mechanism 150 in FIG. 1 for the retrofitted pickup truck. A fixed plate 1310 is attached to the engine block 1120 so its position does not change. The fixed plate 1310 includes a center hole 1330 through which the crankshaft of the engine passes. The diameter of the center hole 1330 is sufficiently large that the crankshaft does not contact the fixed plate 1310 as the crankshaft rotates. The fixed plate 1310 also includes sensors 1320, preferably one per cylinder in the engine. Thus, for the eight cylinder engine in the pickup that was retrofitted, there are eight sensors 1320 spaced equidistantly around the fixed plate, as shown in FIG. 13. Note only two of the sensors are labeled with reference designator 1320, but it is understood the other six are the same type of sensors as well. In one implementation, the sensors 1320 are magnetic reed switches that are normally open, and close when in close proximity to a magnet. Note the position of the sensors 1320 around the fixed plate 1310 will determine when air is introduced into the cylinders through the head plates, and will thus be positioned to cause the air solenoids to inject air into each cylinder at the appropriate time during the stroke of each piston.

Figure 14:
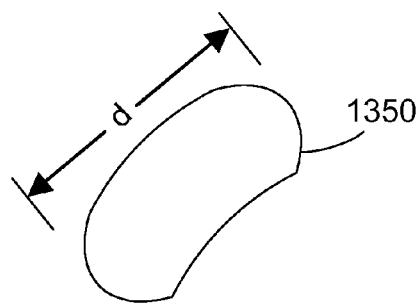
FIG. 14 is a diagram showing one possible variation of shape of the magnet 1350 in FIG. 13.

FIG. 13 also shows a rotating plate 1340. The rotating plate 1340 includes a center hole 1360 through which the crankshaft of the engine passes. The center hole 1360 is configured to engage the crankshaft so rotation of the crankshaft causes rotation of the rotating plate 1340 in close proximity to the fixed plate 1310. The rotating plate 1340 includes a magnet 1350 that passes by the sensors 1320 when the rotating plate 1340 rotates. Note the size and configuration of the magnet 1350 will determine the length of time the magnetic reed switch sensors will be closed. While a circular magnet is shown at 1350 in FIG. 13, FIG. 14 shows an alternative configuration for magnet 1350, which may include an arcuate elongated structure with a length d shown in FIG. 14. The length d of magnet 1350 may be varied according to the length of time the air solenoids need to be open. Thus, a longer magnet will result in a longer burst of compressed air into each cylinder, while a shorter magnet will result in a shorter burst of compressed air into each cylinder. The length d of magnet 1350 in FIG. 14 may thus be selected to produce the most optimum power transfer in the air engine.

Figure 15:
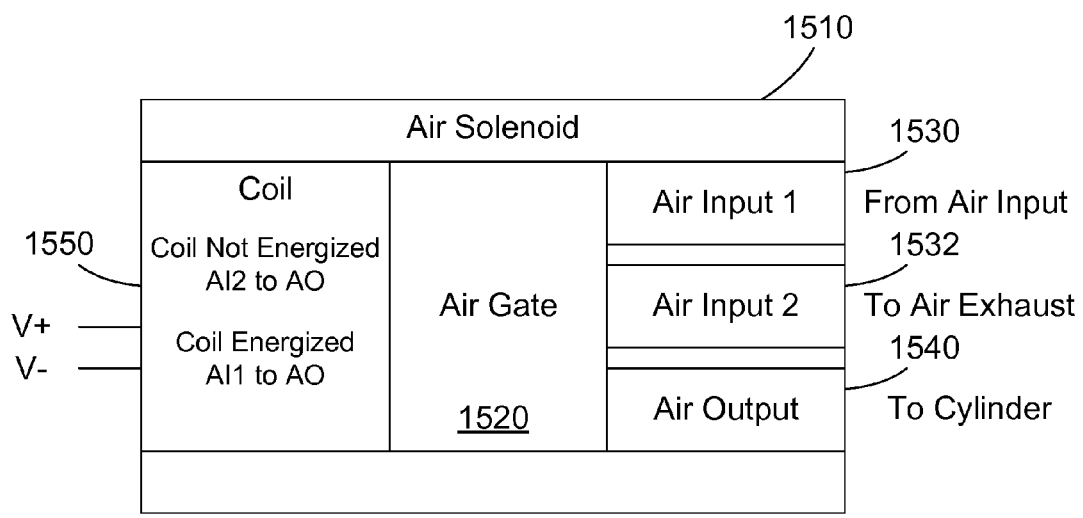
FIG. 15 is a block diagram of a second specific implementation of the air solenoid in FIG. 1 for the air engine made by retrofitting an existing internal combustion engine.

While a first suitable example of an air solenoid 140 is shown in FIG. 5, a second suitable example is shown at 1510 in FIG. 15. Air solenoid 1510 is a second suitable example for air solenoid 140 shown in FIG. 1. The air solenoid 1510 includes two air input ports 1530 and 1532 and one air output port 1540. The first air input port 1530 is connected to the air input from the dryer 1180 in FIG. 11. The second air input port 1532 is connected to an air exhaust line that runs to the input of the DC vacuum pump 1130. The air output 1540 is connected to the corresponding air port on the head plate, which is connected to the cylinder under the head plate. When the coil 1550 of the air solenoid 1510 is not energized, the air gate 1520 connects the second air input 1532 to the air output 1540. When the coil 1550 of the air solenoid is energized, the air gate 1520 connects the first air input 1530 to the air output 1540, thereby providing the compressed air to the cylinder. The air solenoid 1510 thus provides both intake and exhaust functions. When the magnet 1350 on the rotating plate 1340 becomes aligned to a sensor 1320 on the fixed plate 1310, the sensor 1320 will close, thereby energizing the coil 1550 to the air solenoid 1510 corresponding to the sensor 1320. By energizing the coil 1550, the compressed air is passed from the first air input 1530 to the air output 1540, through the air port on the head plate corresponding to the cylinder, and to the cylinder. After the magnet 1350 passes by the sensor 1320 such that the sensor opens, the coil 1550 is no longer energized, causing the second air input 1532 to be connected to the air output 1540, which provides a path for the air exhaust from the cylinder to pass through the air output 1540 through the second air input 1532 to the air exhaust. Thus, whenever the cylinder is not receiving compressed air, it is in an exhaust mode. The air solenoids 1510 can thus replace both intake valves and exhaust valves in a traditional head in an internal combustion engine. One suitable example for air solenoid 1510 is made by Parker Hannifin as part number B5V7BDQ45C 3 WAY 12 DC, which includes a 12 VDC coil.

Figure 16:
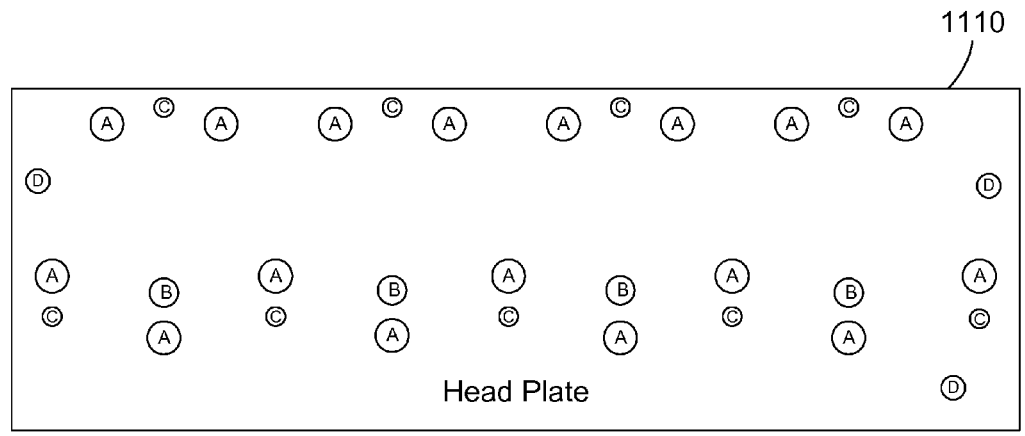
FIG. 16 is a plan view of a head plate that replaces the heads in an internal combustion engine.

One suitable implementation for head plate 1110 is shown in FIG. 16. Note the specific configuration will depend on the internal combustion engine being retrofitted, but there are general concepts that will apply to nearly all heads. Head plate 1110 includes holes A that are unthreaded holes that allow the head plate 1110 to be installed onto the engine block in the place of the heads, which are removed. A suitable head gasket is placed on the engine block, and the head plate 1110 is secured in place using multiple bolts that are torqued to the manufacturer's specifications for securing a conventional head to the engine block. A first set of threaded holes B are connected to the cylinder below, and provide the connection from the air output 1540 of each air solenoid to the cylinder. The threads on holes B allow connecting a threaded connector to the holes and to air output port 1540 of the air solenoid.

Holes C in head plate 1110 are threaded coolant outlet ports. This allows coolant to flow from the engine block through the head plates 1110 through holes C. The holes C are threaded to allow connecting these ports to coolant lines. Three additional unthreaded holes D are also provided in the head plate 1110, and have a diameter that receives dowels in the engine block to assure the head plate 1110 is in the proper position on the engine block before the head plate 1110 is bolted in place.

Figure 17:
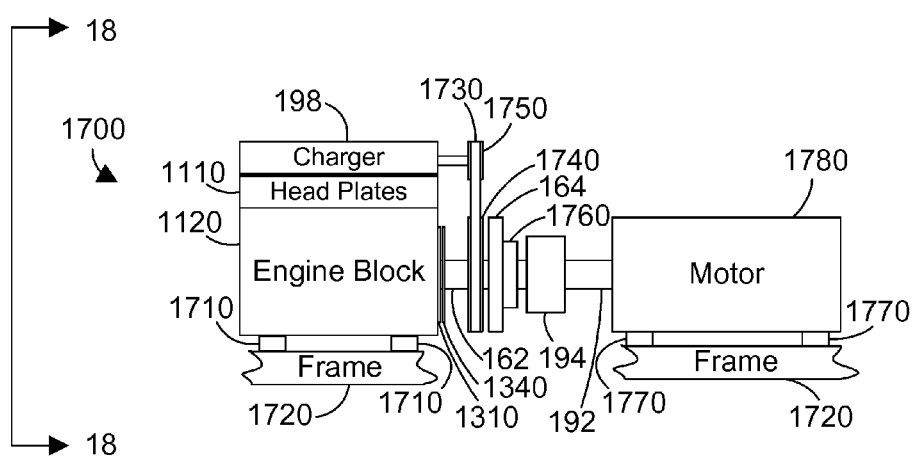
FIG. 17 is a block diagram view of the air engine showing mechanical components.

FIG. 17 shows a mechanical view of the arrangement of components in the Chevrolet retrofitted pickup. The traditional motor mounts for the internal combustion engine were replaced with rigid mounts 1710 to frame 1720. The rigid mounts are needed to secure the position of the air engine 1700 with respect to the motor 1780. Note that air engine 1700 is one suitable implementation for air engine 160 in FIG. 1, and motor 1780 is one suitable implementation for motor 190 in FIG. 1. The drive shaft 162 is shown in FIG. 17, which is the crankshaft for this particular engine. The fixed plate 1310 is attached to the engine block, while the rotating plate 1340 is attached to the drive shaft 162 and rotates with the rotation of the drive shaft 162. A pulley 1740 is connected to drive shaft 162. Pulley 1740 powers a corresponding pulley 1750 on charger 198 via a belt 1730. Belt 1730 may be a v-belt, a grooved belt, a notched belt, or any other suitable belt. While pulleys and a belt are shown in FIG. 17, any suitable method for powering the charger 198 by the air engine is within the scope of the disclosure and claims herein, including sprockets and a chain, etc.

A flywheel 164 is attached to the drive shaft 162. The flywheel can be any suitable size and weight. A smaller, lighter flywheel will store less energy than a larger, heavier flywheel, so the size and weight of the flywheel can be adjusted according to performance needs of the vehicle. The drive shaft 162 is also connected to a magnetic clutch 1760. The magnetic clutch allows the coupling between the drive shaft and the motor to slip if needed. For example, if the vehicle is idling at a stoplight, and the driver then accelerates as the light turns green, a much smoother acceleration would be possible by varying the engagement of the magnetic clutch according to the position of the accelerator. Note the magnetic clutch 1760 shown in FIG. 17 is optional.

Figure 20:
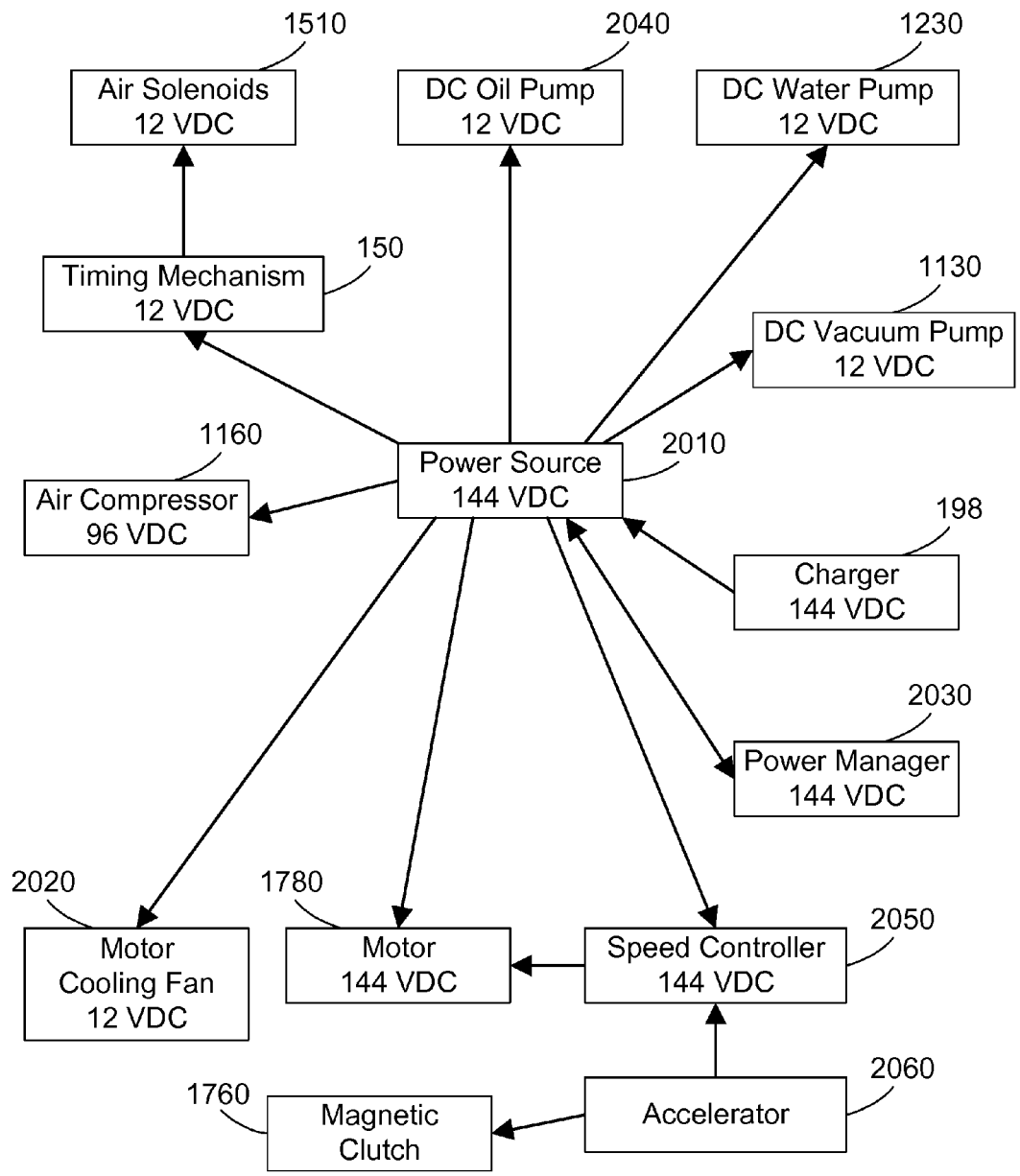
FIG. 20 is a block diagram of the electrical system for the air engine made by retrofitting an existing internal combustion engine.

A coupler 194 provides a fixed coupling between the air engine and the motor shaft 192 of motor 1780 in the retrofitted Chevrolet pickup. A suitable hybrid type of coupler can be made by mating an EK2 Series 450 coupler and an EK6 Series 450 coupler made by R+W America L.P., 1120 Tower Lane, Bensenville, Ill. 60106. This hybrid coupler should provide the performance needed for the retrofitted vehicle. The motor 1780 in the retrofitted pickup is a WarP 9 motor, part no. 00-08219 manufactured by Warfield Electric Co., 175 Industry Ave., Frankfort, Ill. 60423. The WarP 9 motor can run on 72 to 144 VDC. To achieve the revolutions per minute (RPMs) needed for the vehicle retrofit application, the WarP 9 motor will be powered from a 144 VDC power source, as shown in FIG. 20 The motor comes with an accelerator pedal 2060 and a cooling fan 2020 shown in FIG. 20. The motor 1780 is preferably mounted to a bracket 1770 that is bolted to the frame 1720 near the location of the factory radiator, which was removed. This configuration shown in FIG. 17 allows the engine block 1120 and motor 1780 to be rigidly connected to the frame 1720 of the vehicle, allowing a rigid coupler 194 to be used. Due to the high torque produced by the WarP 9 motor 1780, using a rigid coupler is much simpler than using a flexible coupler and reduces vibration. Note the drive shaft would also extend to the left side of the engine block 1120 to a transmission that is not shown in FIG. 17. The transmission would then deliver power from the air engine 1700 to two to four wheels of the vehicle.

Figure 18:
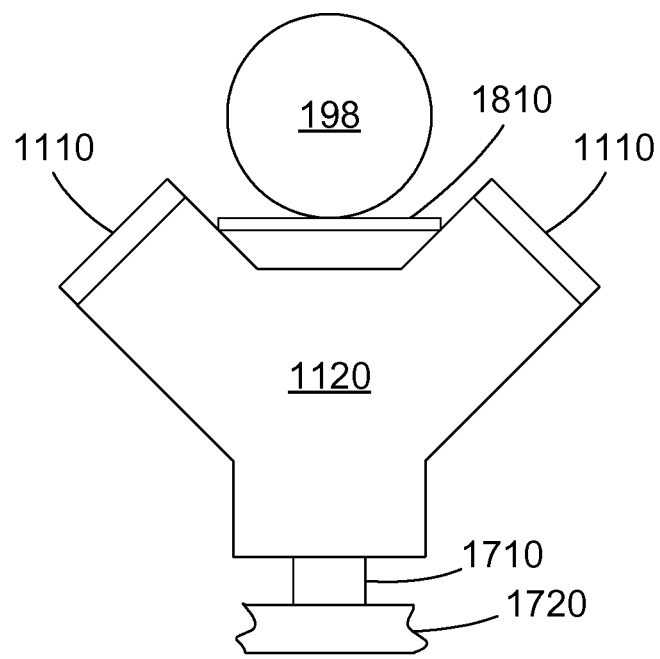
FIG. 18 is an end view of the engine block 1120 shown in FIG. 17 for the air engine made by retrofitting an existing internal combustion engine.

FIG. 18 is a rear view of the air engine 160 taken along the line 18-18 in FIG. 17. The engine block 1120 is a V-8 engine block, which means there are four cylinders in each of the legs of the V shown in FIG. 18. Each side has a corresponding head plate 1110. The charger 198 is preferably mounted to a bracket 1810, which is then bolted to the engine block 1120. Because the heads have been replaced by the head plates 1110, the pushrods in the engine block were also removed. However, the lifters were left in the engine block to hold oil pressure, and small plates were bolted over the push rod openings in the engine block. In addition, the cam shaft was left in place to hold oil pressure in the engine block, but the cam shaft does not rotate when the air engine 160 runs.

The charger 198 is preferably an earth magnet charger that can provide at least 700 amps at 144 VDC. The exact size and shape of the charger can vary according to the desired voltage current, and according to the desired overall size of the charger. For example, Parker Hannifin can manufacture a charger that will satisfy the current and voltage specifications above in a package that is fifteen inches in diameter and four inches thick. Other configurations are possible by reducing the diameter of the charger and increasing its length. Thus, a preferable configuration would be a charger that is an elongated cylinder, which will allow the charger to fit more easily under the hood in the engine compartment.

Figure 19:
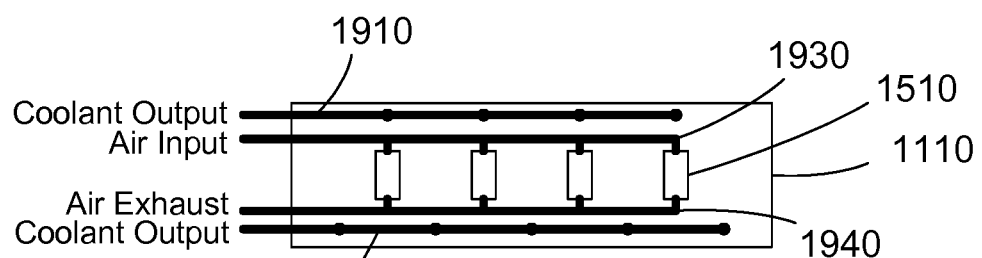
FIG. 19 is a top view of a head plate showing connections for coolant and air for an air engine made by retrofitting an existing internal combustion engine.

FIG. 19 shows the various air and coolant connections to the head plate 1110. Coolant output lines 1910 and 1920 are coupled to the coolant output ports labeled C in FIG. 16. The first air input port 1530 (FIG. 15) on the air solenoids 1510 in FIG. 19 are connected to the air input line 1930, which provides compressed air from the dryer 1180 shown in FIG. 11. The air output port 1540 on the air solenoids 1510 are connected to the cylinders through ports B in the head plate 1110, but these connections are not shown in FIG. 19. The second air input port 1532 on the air solenoids 1510 in FIG. 19 are connected to the air exhaust line 1940, thereby providing an exhaust path from the cylinders to the vacuum pump 1130 in FIG. 11.

FIG. 20 is a block diagram that shows the electrical system for the retrofitted pickup truck. A power source 2010 is one suitable example of power source 110 in FIG. 1. Power source 2010 is preferably 144 VDC, which is provided by twelve 12 VDC batteries connected in series. In the retrofitted Chevrolet pickup, the twelve batteries were installed in the bed. Because the twelve batteries are wired in series, any suitable tap in the twelve battery series may be used to power devices that require a specific voltage. The power source 2010 is connected to a power manager 2030 that is connected to each battery, monitors the state of each battery, and assures the batteries are charged but not overcharged. Power manager 2030 is desirable in the retrofit pickup truck because the motor 1780 runs on 144 VDC but the air compressor 1160 runs on 96 VDC, which means the rate of discharge of eight of the batteries will be higher than the rate of discharge of the remaining four batteries. In addition, many other devices run off 12 VDC. The result is the batteries will have varying states of discharge depending on their position in the twelve battery series. Any suitable power manager may be used that can independently maintain charge on each of the twelve batteries. In the alternative, the power manager 2030 could be omitted altogether.

The devices that run on 12 VCD include the air solenoids 1510, the timing mechanism 150, the DC oil pump 2040, the DC water pump 1230, the DC vacuum pump 1130, and the motor cooling fan 2020. The DC oil pump 2010 is needed because the distributor rotor was removed, which turns the mechanical oil pump on the internal combustion engine. The air compressor 1160 runs on 96 VDC. The speed controller 2050 and motor 1780 run on 144 VDC. The accelerator 2060 is provided with the motor 1780, and connects to the speed controller 2050 using a suitable cable and connector. The speed controller 2050 is one suitable example of speed controller 170 shown in FIG. 1. For the retrofitted Chevrolet pickup, the speed controller is a Soliton1 speed controller available from evnetics, LLC at 2047 4$^{th}$ Avenue South, Saint Petersburg, Fla. 33712. The magnetic clutch 1760 preferably senses the state of the accelerator 2060 to determine how much to allow the magnetic clutch 1760 to slip.

The disclosure and claims herein also include a retrofit kit 2100 shown in FIG. 21. The retrofit kit 2100 is specific to a particular vehicle, and preferably includes a list of components to remove, a specification for number and type of batteries (e.g., twelve 12 VDC deep-cycle batteries for the retrofitted pickup truck), head plates 1110, air solenoids 1510, timing mechanism 150 (one implementation of which is shown in FIGS. 13 and 14), a motor 1780, a speed controller 2050, an accelerator 2060, a coupler 194, an air compressor 1160, an air tank 130 (one implementation of which includes two air tanks 1170A and 1170B shown in FIG. 11), a charger 198, a power manager 2030, a flywheel 164, a DC water pump 1230, fittings and tubing to connect the head plates to the coolant source, fittings and tubing to connect the head plates to the DC water pump, a DC oil pump 2040, a dump valve 1172, a check valve 1140, a dryer 1180, one or more exhaust tanks 1150, a DC vacuum pump 1130, rigid motor mounts 1710, motor mounting bracket 1770, charger mounting bracket 1810, and battery cables and connectors to connect the batteries in series and to the power manager. The list of components to remove is extensive, as it generally includes anything related to the fuel system, the ignition system, and the exhaust system. For the 1992 Chevrolet pickup that was retrofitted, the following parts were removed:

exhaust manifolds;
exhaust pipes;
muffler;
catalytic converter;
exhaust clamps and studs;
spark plugs;
spark plug wires;
distributor;
distributor cap;
distributor rotor;
coil;
fuel tank;
fuel lines;
fuel filter;
fuel pump;
gas cap;
gas neck and hose;
intake;
throttle body/carburetor/injection system;
electronic control module to control ignition system;
air filter assembly;
air filter;
radiator;
cooling fan;
fan clutch;
radiator shroud;
mechanical water pump;
radiator cap; and
thermostat.

Because the air engine system disclosed herein is so much more efficient than internal combustion engines, a small internal combustion engine could be provided to charge the batteries to extend the range of a vehicle. Note, however, the size of the internal combustion engine needed to charge the vehicles is significantly smaller than the size of an internal combustion engine that normally powers the vehicle. Thus, it is expected that a large diesel engine that is used in commercial over-the-road truck tractors could be converted to run on compressed air as described above, and the addition of a small diesel engine to charge the batteries would then provide the range needed to run the truck for a suitable distance, while still providing significant fuel savings.

Another advantage of the air engine system is the lack of combustion, which means the life of the air engine should be significantly higher than for a similar internal combustion engine. The operating temperature of the air engine will be much less because there is no combustion. The engine oil in the prototype golf cart air engine was 10 weight oil, which should last significantly longer than oil in an internal combustion engine because there is no combustion to soil the oil.

While the discussion herein is in terms of an air engine, an air compressor, an air tank, etc., one skilled in the art will readily appreciate that any suitable gas could be used. The term "air" in the disclosure and claims herein expressly extend to any suitable gas that may be compressed, including without limitation air, nitrogen, oxygen, or other gasses or combinations of gasses. Air is the preferred compressed gas because it is plentiful and free.

While the specific examples discussed above are for piston engines, the disclosure and claims herein extend to any suitable type of engine, whether currently known or developed in the future. The air engine disclosed and claimed herein can include any suitable means for converting air pressure to energy to drive a drive shaft. In addition, while traditional internal combustion engines provide rotational energy in the form of a rotational crank shaft that drives a drive shaft, the air engine disclosed and claimed herein can also include other forms of mechanical work, including linear or elliptical movement.

One skilled in the art will appreciate that many variations are possible within the scope of the claims. Thus, while the disclosure is particularly shown and described above, it will be understood by those skilled in the art that these and other changes in form and details may be made therein without departing from the spirit and scope of the claims.

The invention claimed is:

1. An apparatus comprising:
    a power source;
    an air tank;
    an air compressor electrically coupled to the power source that provides compressed air to the air tank;
    an air engine comprising:
        an engine block that includes a plurality of pistons in a plurality of cylinders that provide power to a drive shaft;
        at least one head plate coupled to the engine block having air ports;
        a plurality of air solenoids coupled to air ports on the head plate to provide air input from the compressed air in the air tank to the plurality of cylinders in the engine block through the air ports on the head plate and to provide air exhaust from the plurality of cylinders in the engine block through the air ports on the head plate;
        a timing mechanism that activates the plurality of air solenoids to provide the power to the drive shaft;
    a motor mechanically coupled to the drive shaft and electrically coupled to the power source, wherein speed of the motor determines speed of the drive shaft; and
    an accelerator electrically coupled to the motor that controls speed of the motor.

2. The apparatus of claim 1 wherein the power source comprises a plurality of direct current (DC) batteries.

3. The apparatus of claim 1 wherein the timing mechanism comprises a sensor that detects state of the air engine.

4. The apparatus of claim 1 further comprising a speed controller electrically coupled to the motor and the accelerator that receives input from the accelerator and in response determines speed of the motor.

5. A method for controlling an air engine, the method comprising the steps of:
    (A) providing a power source;
    (B) providing an air tank;
    (C) providing an air compressor electrically coupled to the power source that provides compressed air to the air tank;
    (D) providing the air engine, the air engine performing the steps of:
        (D1) receiving the compressed air from the air tank;
        (D2) introducing the compressed air into an air intake of the air engine under control of a plurality of air solenoids controlled by a timing mechanism that activates the plurality of air solenoids to provide power to a drive shaft;
    (E) providing a motor mechanically coupled to the drive shaft;
    (F) engaging the motor to set the speed of the drive shaft of the air engine, wherein the turning of the air engine by engaging the motor causes the timing mechanism to provide the compressed air from the air tank to the air intake of the air engine, thereby causing the air engine to run; and
    (G) varying the speed of the motor to vary the speed of the air engine.

6. The method of claim 5 further comprising the steps of:
    providing a speed controller electrically coupled to the motor;
    providing an accelerator electrically coupled to the speed controller that determines speed of the motor;
    wherein step (G) is performed by varying the accelerator.

7. The method of claim 5 wherein the power source comprises a plurality of direct current (DC) batteries.

8. The method of claim 5 wherein the timing mechanism comprises an electronic timing mechanism driven by a sensor that detects state of the air engine.

9. The method of claim 5 further comprising the step of providing a charger mechanically coupled to the drive shaft and electrically coupled to the power source that charges the power source when turned by the drive shaft.

10. A method for retrofitting an internal combustion engine having two heads to run on compressed air, the method comprising the steps of:
    removing the two heads from an engine block of the internal combustion engine;
    installing two head plates on the engine block in place of each of the two heads, each head plate including a plurality of coolant output ports and a plurality of air ports;
    installing a plurality of air solenoids to the plurality of air ports on the two head plates, each of the plurality of air solenoids having a first input port coupled to a compressed air source, a second input port coupled to an air exhaust line, and an output port coupled to the plurality of air ports on the head plates, wherein each of the plurality of air solenoids connects the first input port to the output port when a coil is energized, and connects the second input port to the output port when the coil is not energized;
    installing a timing mechanism to selectively energize the coils of the plurality of air solenoids;
    connecting a coolant line to the plurality of coolant output ports on the two heads;
    connecting an electric water pump that causes coolant to flow from the coolant source through the engine block and through the coolant output ports on the two heads, and to the coolant source; and mechanically coupling a drive shaft of the engine block to a motor, where speed of the motor determines speed of the drive shaft, wherein varying the speed of the motor varies the speed of the air engine.

11. The method of claim 10 further comprising the step of removing each of the following components on the internal combustion engine:
exhaust manifolds;
exhaust pipes;
muffler;
catalytic converter;
exhaust clamps and studs;
spark plugs;
spark plug wires;
distributor;
distributor cap;
distributor rotor;
coil;
fuel tank;
fuel lines;
fuel filter;
fuel pump;
gas cap;
gas neck and hose;
intake;
throttle body/carburetor/injection system;
electronic control module to control ignition system;
air filter assembly;
air filter;
radiator;
cooling fan;
fan clutch;
radiator shroud;
mechanical water pump;
radiator cap; and
thermostat.

12. The method of claim 10 further comprising the step of installing each of the following:
a power source comprising a plurality of batteries;
an electric oil pump;
a charger that is turned by the air engine and supplies charging current to the plurality of batteries;
a speed controller that determines speed of the motor; and
an accelerator coupled to the speed controller that determines speed of the motor.

13. A kit to retrofit an existing internal combustion engine to run on compressed air, the kit comprising:
a list of components to remove from the internal combustion engine, the list including heads of the internal combustion engine;
a plurality of head plates configured to replace the removed heads, each head plate including a plurality of coolant output ports and a plurality of air ports;
a plurality of air solenoids, each of the plurality of air solenoids having a first input port, a second input port, and an output port, wherein each of the plurality of air solenoids connects the first input port to the output port when a coil of the air solenoid is energized, and connects the second input port to the output port when the coil is not energized;
a specification for number and type of batteries needed;
a timing mechanism to energize the plurality of air solenoids;
a motor;
a speed controller for the motor;
an accelerator for the speed controller that determines speed of the motor;
a coupler to mechanically couple a drive shaft of the existing internal combustion engine to a shaft of the motor;
an air compressor;
an air tank; and
a charger.

14. The kit of claim 13 further comprising:
a flywheel;
an electric water pump; and
fittings and tubing to connect the coolant output ports on the plurality of head plates to a coolant source.

15. The kit of claim 14 further comprising:
an electric oil pump;
an exhaust tank for receiving air exhaust; and
an electric vacuum pump that pulls air exhaust from the plurality of head plates and pushes the air exhaust to the exhaust tank.

16. The kit of claim 15 further comprising:
rigid motor mounts to replace the original motor mounts for the internal combustion engine;
a bracket for mounting the motor;
a bracket for mounting the charger; and
cables and connectors for connecting a plurality of batteries.

17. The kit of claim 13 wherein the timing mechanism comprises a fixed plate having a plurality of sensors and a rotating plate having at least one magnet, wherein each sensor signals when a magnet is in proximity to the sensor.

18. The kit of claim 13 wherein the list of components to remove from the internal combustion engine further includes:
exhaust manifolds;
exhaust pipes;
muffler;
catalytic converter;
exhaust clamps and studs;
spark plugs;
spark plug wires;
distributor;
distributor cap;
distributor rotor;
coil;
fuel tank;
fuel lines;
fuel filter;
fuel pump;
gas cap;
gas neck and hose;
intake;
throttle body/carburetor/injection system;
electronic control module to control ignition system;
air filter assembly;
air filter;
radiator;
cooling fan;
fan clutch;
radiator shroud;
mechanical water pump;
radiator cap; and
thermostat.

19. A vehicle comprising:
a plurality of direct current (DC) batteries;
an air tank;
an air compressor electrically coupled to the plurality of DC batteries that provides compressed air to the air tank;
an air engine comprising:
an engine block that includes a plurality of pistons in a plurality of cylinders that provide power to a drive shaft;

at least one head plate coupled to the engine block;
a plurality of air solenoids coupled to air ports on the head plate to provide air input from the compressed air in the air tank to the plurality of cylinders in the engine block through the air ports and to provide air exhaust from the plurality of cylinders in the engine block through the air ports;
a timing mechanism that activates the plurality of air solenoids to provide the power to the drive shaft that provides a source of power to wheels of the vehicle;
a motor mechanically coupled to the drive shaft, wherein speed of the motor determines speed of the drive shaft; and
a speed controller electrically coupled to the motor that determines speed of the motor according to position of an accelerator.

* * * * *